(12) United States Patent
De Mondt et al.

(10) Patent No.: US 10,119,043 B2
(45) Date of Patent: Nov. 6, 2018

(54) AQUEOUS INKJET INKS

(71) Applicant: AGFA NV, Mortsel (BE)

(72) Inventors: Roel De Mondt, Mortsel (BE); Hubertus Van Aert, Mortsel (BE)

(73) Assignee: AGFA NV, Mortsel (BE)

( * ) Notice: Subject to any disclaimer, the term of this patent is extended or adjusted under 35 U.S.C. 154(b) by 0 days.

(21) Appl. No.: 15/535,070

(22) PCT Filed: Dec. 8, 2015

(86) PCT No.: PCT/EP2015/078920
§ 371 (c)(1),
(2) Date: Jun. 12, 2017

(87) PCT Pub. No.: WO2016/096527
PCT Pub. Date: Jun. 23, 2016

(65) Prior Publication Data
US 2017/0342287 A1    Nov. 30, 2017

(30) Foreign Application Priority Data

Dec. 16, 2014  (EP) .................................... 14198252

(51) Int. Cl.
| C09D 11/38 | (2014.01) |
| C09D 11/102 | (2014.01) |
| C09D 11/033 | (2014.01) |
| C09D 11/322 | (2014.01) |
| B41J 2/01 | (2006.01) |

(52) U.S. Cl.
CPC ................. *C09D 11/38* (2013.01); *B41J 2/01* (2013.01); *C09D 11/033* (2013.01); *C09D 11/102* (2013.01); *C09D 11/322* (2013.01)

(58) Field of Classification Search
CPC ....................................................... C09D 11/30
See application file for complete search history.

(56) References Cited

U.S. PATENT DOCUMENTS

| 6,461,418 B1 * | 10/2002 | Yue ........................ C09D 11/30 |
| | | 106/31.37 |
| 6,533,408 B1 * | 3/2003 | Erdtmann ................ B41M 5/52 |
| | | 106/31.6 |
| 2004/0061753 A1 * | 4/2004 | Chen .................... B41M 5/0023 |
| | | 347/100 |
| 2005/0271865 A1 | 12/2005 | Elwakil et al. |

(Continued)

FOREIGN PATENT DOCUMENTS

| EP | 0 974 626 A1 | 1/2000 |
| EP | 2 431 190 A2 | 3/2012 |

(Continued)

OTHER PUBLICATIONS

Official Communication issued in International Patent Application No. PCT/EP2015/078920, dated Feb. 29, 2016.

*Primary Examiner* — Gerard Higgins
*Assistant Examiner* — Sathavaram I Reddy
(74) *Attorney, Agent, or Firm* — Keating and Bennett, LLP

(57) ABSTRACT

An aqueous inkjet ink contains: a) a color pigment; b) an alkoxylated fluorosurfactant; and c) an ethoxylated oligomer having a molecular weight smaller than 400; and has a static surface tension at 25° C. of no more than 28 mN·m;
and a viscosity between 5 and 12 mPa·s at 32° C. at a shear rate of 1,000 s$^{-1}$.

15 Claims, 1 Drawing Sheet

(56) References Cited

U.S. PATENT DOCUMENTS

2008/0090032 A1* 4/2008 Perrin .................. B44C 5/04
                                                                      428/32.21
2009/0246480 A1* 10/2009 Saito .................. C09D 11/101
                                                                       428/195.1

FOREIGN PATENT DOCUMENTS

| EP | 2 865 531 A1 | 4/2015 |
| EP | 2 905 376 A1 | 8/2015 |
| WO | 2011/014196 A1 | 2/2011 |

* cited by examiner

AQUEOUS INKJET INKS

CROSS REFERENCE TO RELATED APPLICATIONS

This application is a 371 National Stage Application of PCT/EP2015/078920, filed Dec. 8, 2015. This application claims the benefit of European Application No. 14198252.0, filed Dec. 16, 2014, which is incorporated by reference herein in its entirety.

BACKGROUND OF THE INVENTION

1. Field of the Invention

The present invention relates to aqueous inkjet inks and inkjet printing therewith for manufacturing decorative surfaces.

2. Description of the Related Art

Gravure, offset and flexography are being increasingly replaced for different applications by industrial inkjet printing systems, which have now proven their flexibility in use, such as variable data printing making short production runs and personalized products possible, and their enhanced reliability, allowing incorporation into production lines.

Inkjet technology has also caught the attention of manufacturers of decorative surfaces, such as laminate floor. In the current production process for manufacturing decorative panels as shown by FIG. 1, a paper manufacturer (11) supplies a paper roll (12) to a decor printer (13) who uses gravure printing (14) in order to deliver a decor paper roll (16) to a warehouse (17) of a floor laminate manufacturer (20). Some decor printers (13) are now investigating inkjet printing (15) instead of gravure printing. Rotogravure printing on the porous décor paper generally uses ink having a viscosity at 25° C. of 1 to 2 Pa·s. The viscosity of inkjet inks is much smaller, often about 1 to 15 mPa·s at 25° C. The floor laminate manufacturer (20) stores the decor paper rolls (16) having different decorative patterns in his warehouse (17). Depending on the market demand, the floor laminate manufacturer (20) then selects the decor rolls (16) with the desired decorative pattern in his warehouse (17). The selected decor rolls (16) are then impregnated (18) and cut to size (19) for manufacturing ready-to-use floor laminate (21). The warehouse (17) is necessary as a buffer for sudden large market demands of a specific floor laminate because there is a large time delay between ordering and delivering of new decorative paper rolls (16).

An approach to reduce the size of the warehouse and time delays is treated by EP 2431190 A (THEODOR HYMMEN), which discloses in FIG. 1 a method for producing a digitally printed sheet, web or plate-shaped work piece (20) with wear-resistant surface including the steps of: A) providing a digital data set to a digital printing device (1); B) providing a printable work piece (20) to the printing apparatus (1); C) digital printing at least an acrylate printing ink (22) on the printable work piece (20) using the printing apparatus (1) and thereafter supplying a resin mixture (5, 21) to the digitally printed work piece; and D) curing the resin mixture (5, 21) by means of a heated press (7). The time delay can be avoided by the floor laminate manufacturer incorporating the manufacturing of decorative paper rolls into its own production process. EP 2431190 A (THEODOR HYMMEN) discloses in paragraph [0003] discloses that the use of acrylate ink leads to adhesion problems between the reactive melamine resin mixture and the acrylate ink, requiring specific measures like crosslinking agents that react only above 50° C. or 70° C., making the manufacturing process less robust.

An alternative method as disclosed by unpublished application No. EP 14154124 A (AGFA) uses aqueous inkjet inks on a paper substrate having a special ink-receiving layer for obtaining a good image quality.

Another method as disclosed by unpublished application No. EP 13189662 A (AGFA) uses aqueous inkjet inks containing latex particles. The latter are polymeric resin particles that allow the omission of the special ink-receiving layer for obtaining a good image quality.

EP 974626 A (DUPONT) discloses an ink jet ink composition suitable for use in printing directly to hydrophobic substrates, the ink composition comprising: a) an aqueous vehicle containing at least water and a water-miscible solvent selected from the group consisting of glycols and glycol ethers, wherein water constitutes no more than 80% by weight based on the total weight of the vehicle; b) an insoluble colorant; c) a polymeric dispersant; and d) a surfactant selected from the group consisting of silicon surfactants and fluorinated surfactants.

WO 2011/014196 A (HP) discloses an ink set with near infrared detection capability comprising: a cyan ink including a cyan colorant, a magenta ink including a magenta colorant, and a yellow ink including a yellow colorant, each of the colorants having maximum light absorbance in the visible wavelength range of about 400 to 750 nm, wherein each of the cyan, magenta and yellow inks comprises a near infrared (NIR) absorbing pigment, which is different in spectral absorption characteristic from each of the colorants and absorbs light in the wavelength range of about 750 to 1200 nm.

However in optimizing the viscosity and surface tension of aqueous inkjet inks for specific print heads, adhesion problems were observed for decorative laminates having melamine resin as a wear coating.

Hence, there is still a need for improved aqueous inkjet inks and inkjet printing methods for manufacturing decorative surfaces, having a melamine resin as a wear coating.

SUMMARY OF THE INVENTION

In order to overcome the problems described above, preferred embodiments of the present invention have been realised with an aqueous inkjet ink as defined below.

It was found that good adhesion between the layers in a flooring laminate was obtained by selecting a specific fluorosurfactant and a specific oligomer for the aqueous inkjet ink in order to obtain the desired static surface tension and viscosity.

Another important advantage of the invention is a much simpler manufacturing process of decorative panels, which is immediately visible by comparing FIG. 1 and FIG. 2 showing that our invention requires no longer an intermediate décor printer company (13) or a warehouse (17). Printing in-house at the floor laminate manufacturer (20) allows for maximum flexibility. Changes in design of a decorative colour pattern can be rapidly introduced in production, thereby also minimizing dependency on supply by the décor printer company (13). There are also no longer minimum purchase quantities to be negotiated with the décor printer company (13). In-house printing allows for fast adaptability to market trends and an increase of product variety without substantial financial penalties.

The replacement of gravure by inkjet also has many advantages. There is no longer storage of gravure rolls necessary. Furthermore, inkjet allows easy colour reproduction compared to the time consuming colour matching issues in gravure which usually may take up to 5 hours of tuning. This immediately also illustrates that short print runs using inkjet is much more cost-efficient than gravure.

Further advantages and embodiments of the present invention will become apparent from the following description.

DETAILED DESCRIPTION OF THE PREFERRED EMBODIMENTS

Definitions

Figure 1:
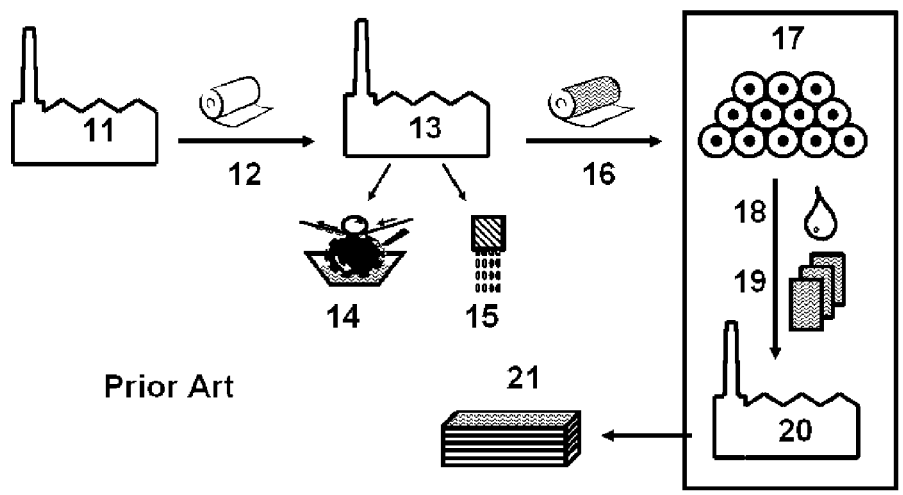
FIG. 1 shows the prior art production process for manufacturing decorative panels, wherein a paper manufacturer (11) supplies a paper roll (12) to a decor printer (13) using gravure printing (14) or inkjet printing (15) in order to deliver a decor paper roll (16) to a warehouse (17) of a floor laminate manufacturer (20). Depending on the market demand, the floor laminate manufacturer (20) selects one of the different decor rolls in his warehouse (17) to impregnate (18) and to cut to a size (19) for being heat pressed and finished into ready-to-use floor laminate (21).

The term "alkyl" means all variants possible for each number of carbon atoms in the alkyl group i.e. methyl, ethyl, for three carbon atoms: n-propyl and isopropyl; for four carbon atoms: n-butyl, isobutyl and tertiary-butyl; for five carbon atoms: n-pentyl, 1,1-dimethyl-propyl, 2,2-dimethyl-propyl and 2-methyl-butyl, etc.

Unless otherwise specified a substituted or unsubstituted alkyl group is preferably a $C_1$ to $C_6$-alkyl group.

Unless otherwise specified a substituted or unsubstituted alkenyl group is preferably a $C_1$ to $C_6$-alkenyl group.

Unless otherwise specified a substituted or unsubstituted alkynyl group is preferably a $C_1$ to $C_6$-alkynyl group.

Unless otherwise specified a substituted or unsubstituted aralkyl group is preferably phenyl group or naphthyl group including one, two, three or more $C_1$ to $C_6$-alkyl groups.

Unless otherwise specified a substituted or unsubstituted alkaryl group is preferably a $C_1$ to $C_6$-alkyl group including a phenyl group or naphthyl group.

Unless otherwise specified a substituted or unsubstituted aryl group is preferably a phenyl group or naphthyl group Unless otherwise specified a substituted or unsubstituted heteroaryl group is preferably a five- or six-membered ring substituted by one, two or three oxygen atoms, nitrogen atoms, sulphur atoms, selenium atoms or combinations thereof.

The term "substituted", in e.g. substituted alkyl group means that the alkyl group may be substituted by other atoms than the atoms normally present in such a group, i.e. carbon and hydrogen. For example, a substituted alkyl group may include a halogen atom or a thiol group. An unsubstituted alkyl group contains only carbon and hydrogen atoms.

Unless otherwise specified a substituted alkyl group, a substituted alkenyl group, a substituted alkynyl group, a substituted aralkyl group, a substituted alkaryl group, a substituted aryl and a substituted heteroaryl group are preferably substituted by one or more substituents selected from the group consisting of methyl, ethyl, n-propyl, isopropyl, n-butyl, isobutyl and tertiary-butyl, ester, amide, ether, thio-ether, ketone, aldehyde, sulfoxide, sulfone, sulfonate ester, sulphonamide, —Cl, —Br, —I, —OH, —SH, —CN and —$NO_2$.

Aqueous Inkjet Inks

An aqueous inkjet ink according to a preferred embodiment of the invention contains a) a colour pigment; b) an alkoxylated fluorosurfactant;

c) an ethoxylated oligomer having an average molecular weight smaller than 400;

having a static surface tension at 25° C. of no more than 28 mN·m; and having a viscosity between 5 and 12 mPa·s at 32° C. at a shear rate of 1,000 $s^{-1}$.

In a preferred embodiment of the aqueous inkjet ink, the alkoxylated fluorosurfactant is an alkoxylated fluorosurfactant containing a sulfonic acid group or a salt thereof.

In a preferred embodiment of the aqueous inkjet ink, the alkoxylated fluorosurfactant is a propoxylated fluorosurfactant, preferably a propoxylated fluorosurfactant containing a sulfonic acid group or a salt thereof.

In a preferred embodiment of the aqueous inkjet ink, the colour pigment is selected from the group consisting of C.I. Pigment Red 122. C.I. Pigment Red 254 and mixed crystals thereof. The use of a red ink in an ink set allows obtaining a large colour gamut for printing wood patterns.

In a preferred embodiment of the aqueous inkjet ink, the aqueous inkjet ink contains a polymer latex binder, preferably a polyurethane based latex. It was observed that polyurethane based latex are not detrimental for adhesion in decorative laminates, such as flooring laminates.

In a preferred embodiment, the aqueous inkjet ink contains glycerol and/or 1,2-hexanediol.

In a preferred embodiment, the aqueous inkjet ink is part of an aqueous inkjet ink set composed of differently coloured inkjet inks. The inkjet ink set may be a standard CMYK ink set, but is preferably a CRYK ink set wherein the magenta (M) inkjet ink is replaced by red (R) inkjet ink. The use of a red inkjet ink enhances the colour gamut for wood based colour patterns, which represent the majority of decorative laminates in flooring laminates.

The inkjet ink set may be extended with extra inks such as white, brown, red, green, blue, and/or orange to further enlarge the colour gamut of the image or to lower the ink load for specific fashion driven decorative colour patterns. The inkjet ink set may also be extended by the combination of the full density inkjet inks with light density inkjet inks. The combination of dark and light colour inks and/or black and grey inks improves the image quality by a lowered graininess. However preferably the inkjet ink set consists of no more than 3 or 4 inkjet inks, allowing the design of single pass and multi-pass inkjet printers of high throughput at acceptable cost.

A preferred aqueous inkjet ink set for manufacturing decorative surfaces consists of a) a cyan aqueous inkjet ink containing a copper phthalocyanine pigment; b) a red aqueous inkjet ink containing a colour pigment selected from the group consisting of C.I Pigment Red 254, C.I. Pigment Red 122, and mixed crystals thereof; c) a yellow aqueous inkjet ink containing a colour pigment selected from the group consisting of C.I Pigment Yellow 151, C.I. Pigment Yellow 74, and mixed crystals thereof; and d) a black aqueous inkjet ink containing carbon black pigment, wherein the aqueous inkjet inks may include a polymer latex binder, more preferably a polyurethane based latex binder.

The aqueous inkjet inks preferably have a surface tension between 18.0 and 28.0 mN/m at 25° C.

Inkjet Printing Methods

An inkjet printing method according to invention comprises the steps of: a) jetting one or more aqueous inkjet inks of the invention on a substrate; and
b) drying the one or more jetted aqueous inkjet inks on the substrate.

In a preferred embodiment of the inkjet printing method, the substrate is a paper substrate, preferably impregnated by a thermosetting resin. In such a case, the one or more jetted aqueous inkjet inks preferably contain a polymer latex binder.

In another preferred embodiment of the inkjet printing method, the substrate is a paper substrate carrying an ink receiver layer containing an inorganic pigment and a polymer.

In still another preferred embodiment of the inkjet printing method, the substrate is selected from the group consisting of polyvinyl chloride, polyethylene terephthalate, and polyalkylene. The latter is preferably polyethylene or polypropylene or mixtures thereof.

The paper of the decorative surface is preferably first impregnated with a thermosetting resin before being inkjet printed upon. In one embodiment, the thermosetting resin impregnated paper is first inkjet printed and then cut into a sheet. The advantage of impregnating before inkjet printing is that dimensional changes due to impregnation are largely eliminated, so that the embossing of wood grain matches with the printed wood pattern.

Figure 2:
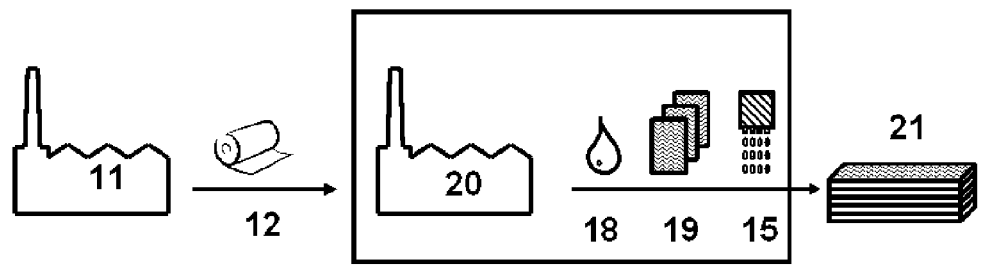
FIG. 2 shows a production process for manufacturing decorative panels, wherein a paper manufacturer (11) supplies a paper roll (12) directly to a floor laminate manufacturer (20) who impregnates (18) the paper roll (12), cuts to a size (19) for being inkjet printed (15) and then heat pressed and finished into ready-to-use floor laminate (21). The order of cutting to size (19) and inkjet printing (15) may also be reversed, i.e. printing on a impregnated paper roll before cutting to sheets.

In a preferred embodiment, as also shown in FIG. 2, the thermosetting resin impregnated paper is first cut into a sheet and then inkjet printed. In the latter, financial losses due to cutting errors are minimized.

In another embodiment, the paper substrate is printed by single pass inkjet printing preferably before resin impregnation and then cut into a sheet. In single pass inkjet printing, resin impregnated paper substrate tends to break more rapidly due to the high transport speed of the paper substrate. By impregnating after single pass printing, a higher productivity is obtained.

The amount of ink lay down for printing the colour pattern is preferably less than 6 g/m² ink as dry weight. A higher amount can lead to delamination, i.e. adhesion problems, because the ink layer acts as a barrier layer for water vapour formed by the crosslinking of the thermosetting resin.

In a preferred embodiment of the inkjet printing method, the thermosetting resin impregnated paper includes a coloured paper substrate, more preferably a bulk coloured paper substrate. The use of a coloured paper substrate reduces the amount of inkjet ink required to form the colour pattern.

In a preferred embodiment of the inkjet printing method, the thermosetting resin is a melamine based resin.

In a preferred embodiment of the inkjet printing method, the one or more aqueous inkjet inks are jetted at a jetting temperature of not more than 35° C.

For having a good ejecting ability and fast inkjet printing, the viscosity of the one or more aqueous inkjet inks at a temperature of 32° C. is preferably smaller than 15 mPa·s, and most preferably between 5 and 12 mPa·s all at a shear rate of 1,000 s$^{-1}$. A preferred jetting temperature is between 10 and 70° C., more preferably between 20 and 40° C., and most preferably between 25 and 35° C.

Alkoxylated Surfactants

The one or more aqueous inkjet inks contain at least one alkoxylated surfactant.

The alkoxylated fluorosurfactant is preferably an ethoxylated or propoxylated fluorosurfactant, preferably containing a sulfonic acid group or a salt thereof.

In a preferred embodiment of the aqueous inkjet ink, the alkoxylated fluorosurfactant is a propoxylated fluorosurfactant, preferably a propoxylated fluorosurfactant containing a sulfonic acid group or a salt thereof.

The one or more aqueous inkjet inks preferably have a surface tension between 18.0 and 28.0 mN/m at 25° C. An aqueous inkjet ink with a surface tension smaller than 18.0 mN/m at 25° C. generally requires a high amount of surfactant, which may cause problems of foaming. A surface tension greater than 28.0 mN/m at 25° C. may cause fouling of the nozzle plate of the print head and/or wetting of ink circuit in the print head.

Particularly preferred is an alkoxylated fluorosurfactant according to Formula (I):

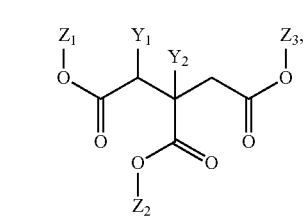

Formula (I)

wherein
$Z_1$, $Z_2$ and $Z_3$ are, independently of one another, groups of the structure $R(O(CR_1R_2)_c-(CR_3R_4)_d)_e-$, branched alkyl groups, or unbranched alkyl groups, with the proviso that at least one of $Z_1$, $Z_2$ and $Z_3$ represents a group of the structure $R(O(CR_1R_2)_c-(CR_3R_4)_d)_e-$;
indices c and d are, independently of one another, 0 to 10, with the proviso that c and d are not simultaneously 0;
e is 0 to 5;
R is a branched or unbranched, fluorine-containing alkyl radical;
R1 to R4 are, independently of one another, hydrogen, a branched alkyl group, or an unbranched alkyl group;
Y1 is an anionic polar group and Y2 is a hydrogen atom, or vice versa; and
X is a cation, preferably a cation selected from the group Na$^+$, Li$^+$, K$^+$ and NH$_4^+$.

In a preferred embodiment, R1 to R3 represents hydrogen and R4 represents a methyl group, and more preferably the anionic polar group is a sulfonic acid group or a salt thereof.

Particularly preferred examples of alkoxylated fluorosurfactants according to Formula (I) are shown in Table 1.

TABLE 1
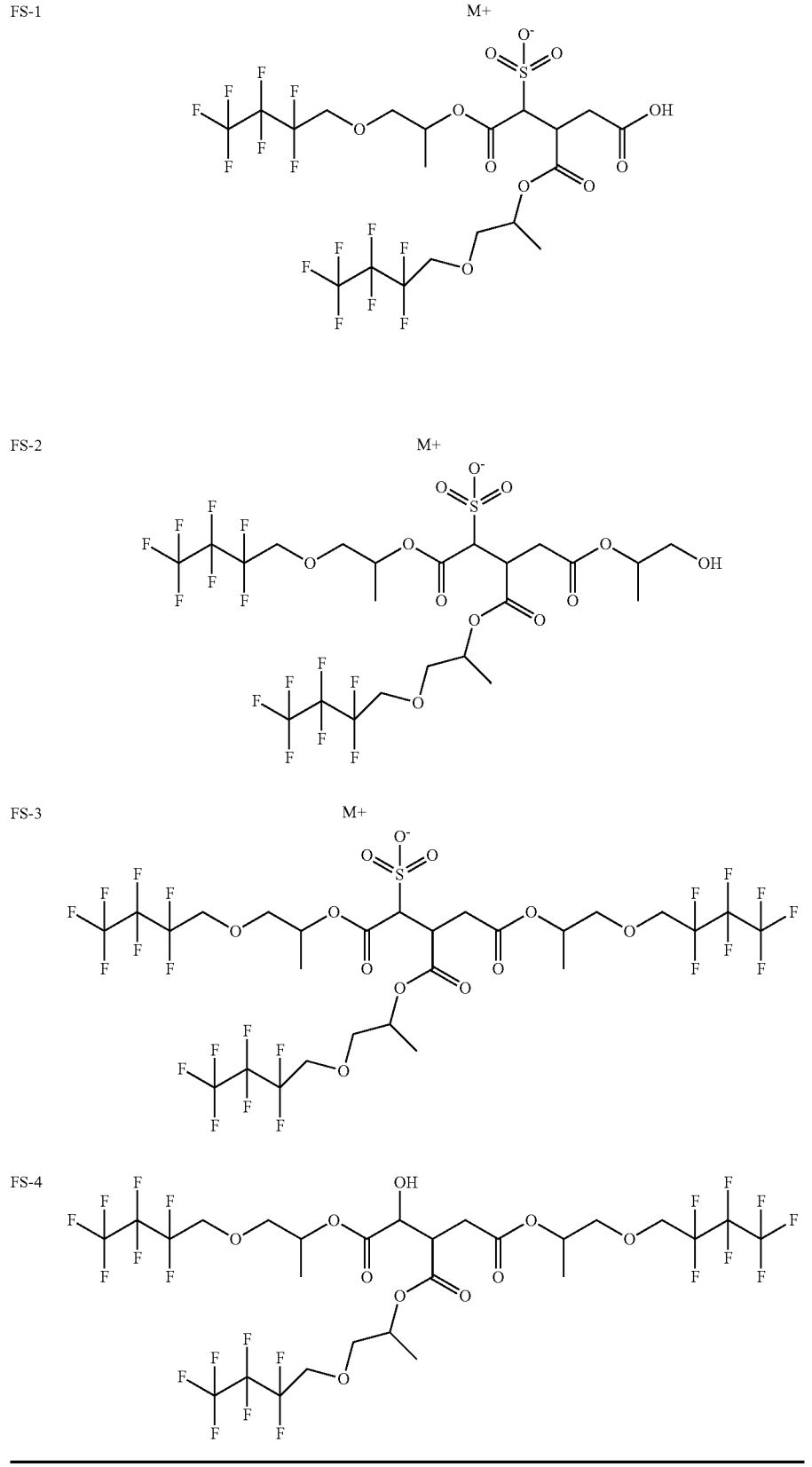

Ethoxylated Oligomers

The aqueous inkjet ink includes an ethoxylated oligomer having an average molecular weight smaller than 400, preferably having an average molecular weight of 170 to 325.

In a preferred embodiment, the ethoxylated oligomer is a poly(ethylene glycol) having an average molecular weight smaller than 400.

In a preferred embodiment, the ethoxylated oligomer has a structure according to Formula (II):

$$R_2(OCH_2CH_2)_nOR_1 \quad \text{Formula (II)},$$

wherein $R_1$ and $R_2$ are independently selected from hydrogen and an alkyl group having 1 to 4 carbon atoms, preferably a methyl or ethyl group; and n is an integer of 4 to 10, preferably 5 to 8. In a preferred embodiment, $R_1$ and $R_2$ both represent hydrogen.

A particularly preferred ethoxylated oligomer is a poly(ethylene glycol) 200 available from SIGMA-ALDRICH.

It is believed that the ethoxylated oligomer also influences the surface tension and that it interacts with the alkoxylated surfactant. However, the exact nature of interaction is not known.

Colorants

The colorant in the one or more aqueous inkjet inks is a colour pigment. Dyes have shown to possess insufficient light stability for decorative surfaces, such as flooring laminates. The one or more pigmented aqueous inkjet inks preferably contain a dispersant, more preferably a polymeric dispersant, for dispersing the pigment. The one or more may contain a dispersion synergist to improve the dispersion quality and stability of the ink.

In another embodiment of the one or more pigmented aqueous inkjet inks, the one or more pigmented aqueous inkjet inks contain a so-called "self dispersible" colour pigment. A self-dispersible colour pigment requires no dispersant, because the pigment surface has ionic groups which realize electrostatic stabilization of the pigment dispersion. In case of self-dispersible colour pigments, the steric stabilization obtained by using a polymeric dispersant becomes optional. The preparation of self-dispersible colour pigments is well-known in the art and can be exemplified by EP 904327 A (CABOT).

The colour pigments may be black, white, cyan, magenta, yellow, red, orange, violet, blue, green, brown, mixtures thereof, and the like. A colour pigment may be chosen from those disclosed by HERBST, Willy, et al. Industrial Organic Pigments, Production, Properties, Applications. 3rd edition. Wiley—VCH, 2004. ISBN 3527305769.

A particularly preferred pigment for a cyan aqueous inkjet ink is a copper phthalocyanine pigment, more preferably C.I. Pigment Blue 15:3 or C.I. Pigment Blue 15:4.

Particularly preferred pigments for a red aqueous inkjet ink are C.I Pigment Red 254 and C.I. Pigment Red 122, and mixed crystals thereof.

Particularly preferred pigments for yellow aqueous inkjet ink are C.I Pigment Yellow 151 and C.I. Pigment Yellow 74, and mixed crystals thereof.

For the black ink, suitable pigment materials include carbon blacks such as Regal™ 400R, Mogul™ L, Elftex™ 320 from Cabot Co., or Carbon Black FW18, Special Black™ 250, Special Black™ 350, Special Black™ 550, Printex™ 25, Printex™ 35, Printex™ 55, Printex™ 90, Printex™ 150T from DEGUSSA Co., MA8 from MITSUBISHI CHEMICAL Co., and C.I. Pigment Black 7 and C.I. Pigment Black 11.

Also mixed crystals may be used. Mixed crystals are also referred to as solid solutions. For example, under certain conditions different quinacridones mix with each other to form solid solutions, which are quite different from both physical mixtures of the compounds and from the compounds themselves. In a solid solution, the molecules of the components enter into the same crystal lattice, usually, but not always, that of one of the components. The x-ray diffraction pattern of the resulting crystalline solid is characteristic of that solid and can be clearly differentiated from the pattern of a physical mixture of the same components in the same proportion. In such physical mixtures, the x-ray pattern of each of the components can be distinguished, and the disappearance of many of these lines is one of the criteria of the formation of solid solutions. A commercially available example is Cinquasia™ Magenta RT-355-D from Ciba Specialty Chemicals.

Also mixtures of pigments may be used. For example, the inkjet ink includes a carbon black pigment and at least one pigment selected from the group consisting of a blue pigment, a cyan pigment, magenta pigment and a red pigment. It was found that such a black inkjet ink allowed easier and better colour management for wood colours.

The pigment particles in the pigmented inkjet ink should be sufficiently small to permit free flow of the ink through the inkjet printing device, especially at the ejecting nozzles. It is also desirable to use small particles for maximum colour strength and to slow down sedimentation.

The average particle size of the pigment in the pigmented inkjet ink should be between 0.005 μm and 15 μm. Preferably, the average pigment particle size is between 0.005 and 5 μm, more preferably between 0.005 and 1 μm, particularly preferably between 0.005 and 0.3 μm and most preferably between 0.040 and 0.150 μm.

The pigment is used in the pigmented inkjet ink in an amount of 0.1 to 20 wt %, preferably 1 to 10 wt %, and most preferably 2 to 5 wt % based on the total weight of the pigmented inkjet ink. A pigment concentration of at least 2 wt % is preferred to reduce the amount of inkjet ink needed to produce the colour pattern, while a pigment concentration higher than 5 wt % reduces the colour gamut for printing the colour pattern with print heads having a nozzle diameter of 20 to 50 μm.

Dispersants

The pigmented inkjet ink preferably contains a dispersant, more preferably a polymeric dispersant, for dispersing the pigment.

Suitable polymeric dispersants are copolymers of two monomers but they may contain three, four, five or even more monomers. The properties of polymeric dispersants depend on both the nature of the monomers and their distribution in the polymer. Copolymeric dispersants preferably have the following polymer compositions:

statistically polymerized monomers (e.g. monomers A and B polymerized into ABBAABAB);
  alternating polymerized monomers (e.g. monomers A and B polymerized into ABABABAB);
  gradient (tapered) polymerized monomers (e.g. monomers A and B polymerized into AAABAABBABBB);
  block copolymers (e.g. monomers A and B polymerized into AAAAABBBBBB) wherein the block length of each of the blocks (2, 3, 4, 5 or even more) is important for the dispersion capability of the polymeric dispersant;
  graft copolymers (graft copolymers consist of a polymeric backbone with polymeric side chains attached to the backbone); and mixed forms of these polymers, e.g. blocky gradient copolymers.

Suitable dispersants are DISPERBYK™ dispersants available from BYK CHEMIE, JONCRYL™ dispersants available from JOHNSON POLYMERS and SOLSPERSE™ dispersants available from ZENECA. A detailed list of non-polymeric as well as some polymeric dispersants is disclosed by MC CUTCHEON. Functional Materials, North American Edition. Glen Rock, N.J.: Manufacturing Confectioner Publishing Co., 1990. p. 110-129.

The polymeric dispersant has preferably a number average molecular weight Mn between 500 and 30000, more preferably between 1500 and 10000.

The polymeric dispersant has preferably a weight average molecular weight Mw smaller than 100,000, more preferably smaller than 50,000 and most preferably smaller than 30,000.

In a particularly preferred embodiment, the polymeric dispersant used in the one or more pigmented inkjet inks is a copolymer comprising between 3 and 11 mol % of a long aliphatic chain (meth)acrylate wherein the long aliphatic chain contains at least 10 carbon atoms.

The long aliphatic chain (meth)acrylate contains preferably 10 to 18 carbon atoms. The long aliphatic chain (meth)acrylate is preferably decyl (meth)acrylate. The polymeric dispersant can be prepared with a simple controlled polymerization of a mixture of monomers and/or oligomers including between 3 and 11 mol % of a long aliphatic chain (meth)acrylate wherein the long aliphatic chain contains at least 10 carbon atoms.

A commercially available polymeric dispersant being a copolymer comprising between 3 and 11 mol % of a long aliphatic chain (meth)acrylate is Edaplan™ 482, a polymeric dispersant from MUNZING.

Polymer Latex Binders

The one or more aqueous inkjet inks may contain a polymer latex binder. In such a case, an ink acceptance layer on the substrate can be omitted.

The polymer latex binder is not particularly limited as long as it has stable dispersibility in the ink composition. There is no limitation on the main chain skeleton of the water-insoluble polymer. Examples of the polymer include a vinyl polymer and a condensed polymer (e.g., an epoxy resin, polyester, polyurethane, polyamide, cellulose, polyether, polyurea, polyimide, and polycarbonate). Among the above, a vinyl polymer is particularly preferable because of easily controlled synthesis.

In a particularly preferred embodiment the polymer latex is a polyurethane latex, more preferably a self-dispersible polyurethane latex. The polymer latex binder in the one or more aqueous inkjet inks is preferably a polyurethane based latex binder for reasons of compatibility with the thermosetting resin.

In a particularly preferred embodiment, the one or more aqueous inkjet inks include inter-crosslinkable latex particles. Suitable examples are disclosed by EP 2467434 A (HP), however preferably the inter-crosslinking is obtained using (meth)acrylate groups.

Preferred hydrophobic monomers for synthesizing latexes include, without limitation, styrene, p-methyl styrene, methyl methacrylate, hexyl acrylate, hexyl methacrylate, 2-ethylhexyl acrylate, 2-ethylhexyl methacrylate, butyl acrylate, butyl methacrylate, ethyl acrylate, ethyl methacrylate, propyl acrylate, propyl methacrylate, octadecyl acrylate, stearyl methacrylate, vinylbenzyl chloride, isobornyl acrylate, tetrahydrofurfuryl acrylate, 2-phenoxyethyl methacrylate, ethoxylated nonyl phenol methacrylate, isobornyl methacrylate, cyclohexyl methacrylate, t-butyl methacrylate, n-octyl methacrylate, lauryl methacrylate, tridecyl methacrylate, alkoxylated tetrahydrofurfuryl acrylate, isodecyl acrylate, isobornylmethacrylate, derivatives thereof, and mixtures thereof.

The polymerized monomers of the latex particulates preferably include a crosslinker that crosslinks the polymerized monomers and enhances the durability of the composite latex particulate. Suitable cross-linking monomers are polyfunctional monomers and oligomers such as, without limitation, ethylene glycol dimethacrylate, diethylene glycol dimethacrylate, ethylene glycol diacrylate, diethylene glycol diacrylate, 1,6-hexanediol diacrylate, tetraethylene glycol diacrylate, tripropylene glycol diacrylate, ethoxylated bisphenol A diacrylate, pentaerythritol tri- and tetraacrylate, N,N'-methylenebisacrylamide, divinylbenzene and combinations thereof, mixtures thereof, and derivatives thereof. When present, the cross-linkers preferably comprise from 0.1 wt % to 15 wt % of the polymerized monomers.

The polymer latex is preferably a self-dispersing polymer latex, and more preferably a self-dispersing polymer latex having a carboxyl group, from the viewpoint of ejecting stability and stability of the liquid (particularly, dispersion stability) when using a colour pigment. The self-dispersing polymer latex means a latex of a water-insoluble polymer that does not contain a free emulsifier and that can get into a dispersed state in an aqueous medium even in the absence of other surfactants due to a functional group (particularly, an acidic group or a salt thereof) that the polymer itself has.

In preparing a self-dispersing polymer latex, preferably a monomer is used selected from the group consisting of an unsaturated carboxylic acid monomer, an unsaturated sulfonic acid monomer, and an unsaturated phosphoric acid monomer.

Specific examples of the unsaturated carboxylic acid monomer include acrylic acid, methacrylic acid, crotonic acid, itaconic acid, maleic acid, fumaric acid, citraconic acid, and 2-methacryloyloxy methylsuccinic acid. Specific examples of the unsaturated sulfonic acid monomer include styrene sulfonic acid, 2-acrylamido-2-methyl propane sulfonic acid, 3-sulfopropyl (meth)acrylate, and bis-(3-sulfopropyl)-itaconate. Specific examples of the unsaturated phosphoric acid monomer include vinyl phosphoric acid, vinyl phosphate, bis(methacryloxyethyl)phosphate, diphenyl-2-acryloyloxyethyl phosphate, diphenyl-2-methacryloyloxyethyl phosphate, and dibutyl-2-acryloyloxyethyl phosphate.

The latex binder polymer particles preferably have a glass transition temperature (Tg) of 30° C. or more.

The minimum film-forming temperature (MFT) of the polymer latex is preferably −25 to 150° C., and more preferably 35 to 130° C.

Biocides

Suitable biocides for the aqueous inkjet inks used in the present invention include sodium dehydroacetate, 2-phenoxyethanol, sodium benzoate, sodium pyridinethion-1-oxide, ethyl p-hydroxybenzoate and 1,2-benzisothiazolin-3-one and salts thereof.

Preferred biocides are Proxel™ GXL and Proxel™ Ultra 5 available from ARCH UK BIOCIDES and Bronidox™ available from COGNIS.

A biocide is preferably added in an amount of 0.001 to 3.0 wt. %, more preferably 0.01 to 1.0 wt. %, each based on the total weight of the pigmented inkjet ink.

Humectants

The aqueous inkjet ink preferably contains a humectant.

Suitable humectants include triacetin, N-methyl-2-pyrrolidone, 2-pyrrolidone, glycerol, urea, thiourea, ethylene urea, alkyl urea, alkyl thiourea, dialkyl urea and dialkyl thiourea, diols, including ethanediols, propanediols, propanetriols, butanediols, pentanediols, and hexanediols. Preferred humectants are 2-pyrrolidone, glycerol and 1,2-hexanediol, the latter were found to be the most effective for improving inkjet printing reliability in an industrial environment.

The humectant is preferably added to the inkjet ink formulation in an amount of 0.1 to 35 wt % of the formulation, more preferably 1 to 30 wt % of the formulation, and most preferably 3 to 25 wt % of the formulation.

pH Adjusters

The aqueous inkjet ink may contain at least one pH adjuster. Suitable pH adjusters include NaOH, KOH, $NEt_3$, $NH_3$, HCl, $HNO_3$, $H_2SO_4$ and (poly)alkanolamines such as triethanol amine and 2-amino-2-methyl-1-propanol. Preferred pH adjusters are triethanol amine, NaOH and $H_2SO_4$.

Preparation of Inkjet Inks

The one or more aqueous inkjet inks may be prepared by precipitating or milling the colour pigment in the dispersion medium in the presence of the polymeric dispersant, or simply by mixing a self-dispersible colour pigment in the ink.

Mixing apparatuses may include a pressure kneader, an open kneader, a planetary mixer, a dissolver, and a Dalton Universal Mixer. Suitable milling and dispersion apparatuses are a ball mill, a pearl mill, a colloid mill, a high-speed disperser, double rollers, a bead mill, a paint conditioner, and triple rollers. The dispersions may also be prepared using ultrasonic energy.

If the inkjet ink contains more than one pigment, the colour ink may be prepared using separate dispersions for each pigment, or alternatively several pigments may be mixed and co-milled in preparing the dispersion.

The dispersion process can be carried out in a continuous, batch or semi-batch mode.

The preferred amounts and ratios of the ingredients of the mill grind will vary widely depending upon the specific materials and the intended applications. The contents of the milling mixture comprise the mill grind and the milling media. The mill grind comprises pigment, dispersant and a liquid carrier such as water. For aqueous ink-jet inks, the pigment is usually present in the mill grind at 1 to 50 wt %, excluding the milling media. The weight ratio of pigment over dispersant is preferably 20:1 to 1:2.

The milling time can vary widely and depends upon the pigment, selected mechanical means and residence conditions, the initial and desired final particle size, etc. In the present invention pigment dispersions with an average particle size of less than 100 nm may be prepared.

After milling is completed, the milling media is separated from the milled particulate product (in either a dry or liquid dispersion form) using conventional separation techniques, such as by filtration, sieving through a mesh screen, and the like. Often the sieve is built into the mill, e.g. for a bead mill. The milled pigment concentrate is preferably separated from the milling media by filtration.

In general it is desirable to make the colour ink in the form of a concentrated mill grind, which is subsequently diluted to the appropriate concentration for use in the ink-jet printing system. This technique permits preparation of a greater quantity of pigmented ink from the equipment. If the mill grind was made in a solvent, it is diluted with water and optionally other solvents to the appropriate concentration. If it was made in water, it is diluted with either additional water or water miscible solvents to make a mill grind of the desired concentration. By dilution, the ink is adjusted to the desired viscosity, colour, hue, saturation density, and print area coverage for the particular application.

Decorative Surfaces

The decorative surfaces are preferably rigid or flexible panels, but may also be rolls of a flexible substrate. In a preferred embodiment the decorative panels are selected from the group consisting of kitchen panels, flooring panels, furniture panels, ceiling panels and wall panels.

Figure 3:
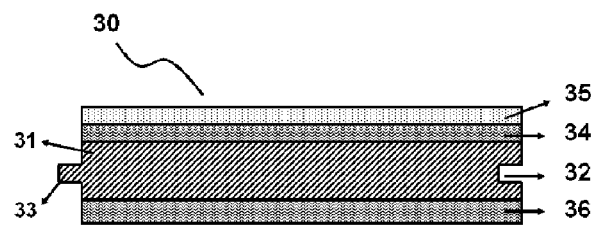
FIG. 3 shows a cross-section of a decorative panel (30) including a core layer (31) with a groove (32) and tongue (33) which is laminated on the top side by a decorative layer (34) and a protective layer (35) and on the back side by a balancing layer (36).

A decorative panel (30), illustrated by a flooring panel having also a tongue and groove join (33, 32) in FIG. 3, includes preferably at least a core layer (31) and a decorative layer (34). In order to protect the colour pattern of the decorative layer (34) against wear, a protective layer (35) may be applied on top of the decorative layer (34). A balancing layer (36) may also be applied at the opposite side of the core layer (31) to restrict or prevent possible bending of the decorative panel (30). The assembly into a decorative panel of the balancing layer, the core layer, the decorative layer, and preferably also a protective layer, is preferably performed in the same press treatment of preferably a DPL process (Direct Pressure Laminate).

In a preferred embodiment of decorative panels, tongue and groove profiles (33 respectively 32 in FIG. 3) are milled into the side of individual decorative panels which allow them to be slid into one another. The tongue and grove join ensures, in the case of flooring panels, a sturdy floor construction and protects the floor, preventing dampness from penetrating.

Figure 4:
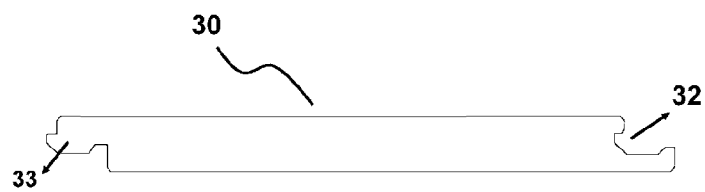
FIG. 4. shows a cross section of a decorative panel (30) having a mechanical join by a tongue (33) and a groove (32) requiring no glue.

In a more preferred embodiment, the decorative panels include a tongue and a groove of a special shape (e.g. 33 respectively 32 in FIG. 4) which allow them to be clicked into one another. The advantage thereof is an easy assembly requiring no glue. The shape of the tongue and groove necessary for obtaining a good mechanical join is well-known in the art of laminate flooring, as also exemplified in EP 2280130 A (FLOORING IND), WO 2004/053258 (FLOORING IND), US 2008010937 (VALINGE) and U.S. Pat. No. 6,418,683 (PERSTORP FLOORING).

The tongue and groove profiles are especially preferred for flooring panels and wall panels, but in the case of furniture panels, such tongue and groove profile is preferably absent for aesthetical reasons of the furniture doors and drawer fronts. However, a tongue and groove profile may be used to click together the other panels of the furniture, as illustrated by US 2013071172 (UNILIN).

The decorative surfaces, especially decorative panels, may further include a sound-absorbing layer as disclosed by U.S. Pat. No. 8,196,366 (UNILIN).

In a preferred embodiment, the decorative panel is an antistatic layered panel. Techniques to render decorative panels antistatic are well-known in the art of decorative surfaces as exemplified by EP 1567334 A (FLOORING IND).

The top surface of the decorative surface, i.e. at least the protective layer, is preferably provided with a relief matching the colour pattern, such as for example the wood grain, cracks and nuts in a woodprint. Embossing techniques to accomplish such relief are well-known and disclosed by, for example, EP 1290290 A (FLOORING IND), US 2006144004 (UNILIN), EP 1711353 A (FLOORING IND) and US 2010192793 (FLOORING IND).

In a preferred embodiment, the decorative panels are made in the form of rectangular oblong strips. The dimensions thereof may vary greatly. Preferably the panels have a length exceeding 1 meter, and a width exceeding 0.1 meter, e.g. the panels can be about 1.3 meter long and about 0.15 meter wide. According to a special embodiment the length of the panels exceeds 2 meter, with the width being preferably about 0.2 meter or more. The print of such panels is preferably free form repetitions.

Core Layers

The core layer is preferably made of wood-based materials, such as particle board, MDF or HDF (Medium Density Fibreboard or High Density Fibreboard), Oriented Strand Board (OSB) or the like. Also, use can be made of boards of synthetic material or boards hardened by means of water, such as cement boards. In a particularly preferred embodiment, the core layer is a MDF or HDF board.

The core layer may also be assembled at least from a plurality of paper sheets, or other carrier sheets, impregnated with a thermosetting resin as disclosed by WO 2013/050910 (UNILIN). Preferred paper sheets include so-called Kraft paper obtained by a chemical pulping process also known as the Kraft process, e.g. as described in U.S. Pat. No. 4,952,277 (BET PAPERCHEM).

In another preferred embodiment, the core layer is a board material composed substantially of wood fibres which are bonded by means of a polycondensation glue, wherein the polycondensation glue forms 5 to 20 percent by weight of the board material and the wood fibres are obtained for at least 40 percent by weight from recycled wood. Suitable examples are disclosed by EP 2374588 A (UNILIN).

Instead of a wood based core layer, also a synthetic core layer may be used, such as those disclosed by US 2013062006 (FLOORING IND). In a preferred embodiment, the core layer comprises a foamed synthetic material, such as foamed polyethylene or foamed polyvinyl chloride.

Other preferred core layers and their manufacturing are disclosed by US 2011311806 (UNILIN) and U.S. Pat. No. 6,773,799 (DECORATIVE SURFACES).

The thickness of the core layer is preferably between 2 and 12 mm, more preferably between 5 and 10 mm.

Paper Substrates

The decorative layer and preferably, if present also the protective layer and/or balancing layer, include paper as substrate.

The paper preferably has a weight of less than 150 g/m$^2$, because heavier paper sheets are hard to impregnate all through their thickness with a thermosetting resin. Preferably said paper layer has a paper weight, i.e. without taking into account the resin provided on it, of between 50 and 100 g/m$^2$ and possibly up to 130 g/m$^2$. The weight of the paper cannot be too high, as then the amount of resin needed to sufficiently impregnate the paper would be too high, and reliably further processing the printed paper in a pressing operation becomes badly feasible.

Preferably, the paper sheets have a porosity according to Gurley's method (DIN 53120) of between 8 and 20 seconds. Such porosity allows even for a heavy sheet of more than 150 g/m$^2$ to be readily impregnated with a relatively high amount of resin.

Suitable paper sheets having high porosity and their manufacturing are also disclosed by U.S. Pat. No. 6,709,764 (ARJO WIGGINS).

The paper for the decorative layer is preferably a white paper and may include one or more whitening agents, such as titanium dioxide, calcium carbonate and the like. The presence of a whitening agent helps to mask differences in colour on the core layer which can cause undesired colour effects on the colour pattern.

Alternatively, the paper for the decorative layer is preferably a bulk coloured paper including one or more colour dyes and/or colour pigments. Besides the masking of differences in colour on the core layer, the use of a coloured paper reduces the amount of inkjet ink required to print the colour pattern. For example, a light brown or grey paper may be used for printing a wood motif as colour pattern in order to reduce the amount of inkjet ink needed.

In a preferred embodiment, unbleached Kraft paper is used for a brownish coloured paper in the decorative layer. Kraft paper has a low lignin content resulting in a high tensile strength. A preferred type of Kraft paper is absorbent Kraft paper of 40 to 135 g/m$^2$ having high porosity, and made from clean low kappa hardwood Kraft of good uniformity.

If the protective layer includes a paper, then a paper is used which becomes transparent or translucent after resin impregnation so that for the colour pattern in the decorative layer can be viewed.

The above papers may also be used in the balancing layer.

If the aqueous inkjet ink contains a polymer latex binder, no special ink acceptance layer was necessary for obtaining good image quality. Hence, the paper is preferably free of any separate ink acceptance layer upon printing.

If the aqueous inkjet ink does not contain a polymer latex binder, then preferably an ink acceptance layer is present for enhancing the image quality.

For the sake of clarity, it should be clear that resin coated papers, so-called RC papers, are not the thermosetting resin impregnated papers of the inkjet printing method according to the invention. The RC papers used in home/office aqueous inkjet printing consist of a porous paper core free of resin. The RC papers have only on their surface a resin coating, usually a polyethylene or polypropylene resin coating, with thereon one or more ink acceptance layers, usually containing a hydrophilic polymer like polyvinylalcohol and optionally porous pigments like fumed silica. Such RC papers have a low permeability for the thermosetting resin leading to inhomogeneous resin absorption and higher risk for delamination after pressing.

Ink Acceptance Layers

If present, the ink acceptance layer may be a purely polymer based ink acceptance layer, but preferably contains an inorganic pigment and a polymeric binder. The inorganic pigment may be a single type of inorganic pigment or a plurality of different inorganic pigments. The polymeric binder may be a single type of polymeric binder or a plurality of different polymeric binders.

In a preferred embodiment, the ink acceptance layer has a total dry weight between 2.0 g/m$^2$ and 10.0 g/m$^2$, more preferably between 3.0 and 6.0 g/m$^2$.

In a preferred embodiment, the ink acceptance layer includes a polymeric binder selected from the group consisting of hydroxyethyl cellulose; hydroxypropyl cellulose; hydroxyethylmethyl cellulose; hydroxypropyl methyl cellulose; hydroxybutylmethyl cellulose; methyl cellulose; sodium carboxymethyl cellulose; sodium carboxymethylhydroxethyl cellulose; water soluble ethylhydroxyethyl cellulose; cellulose sulfate; polyvinyl alcohol; vinylalcohol copolymers; polyvinyl acetate; polyvinyl acetal; polyvinyl pyrrolidone; polyacrylamide; acrylamide/acrylic acid copolymer; polystyrene, styrene copolymers; acrylic or methacrylic polymers; styrene/acrylic copolymers; ethylene-vinylacetate copolymer; vinyl-methyl ether/maleic acid copolymer; poly(2-acrylamido-2-methyl propane sulfonic acid); poly(diethylene triamine-co-adipic acid); polyvinyl pyridine; polyvinyl imidazole; polyethylene imine epichlorohydrin modified; polyethylene imine ethoxylated; ether bond-containing polymers such as polyethylene oxide (PEO), polypropylene oxide (PPO), polyethylene glycol (PEG) and polyvinyl ether (PVE); polyurethane; melamine resins; gelatin; carrageenan; dextran; gum arabic; casein; pectin; albumin; chitins; chitosans; starch; collagen derivatives; collodion and agar-agar.

In a particularly preferred embodiment, the ink acceptance layer includes a polymeric binder, preferably a water soluble polymeric binder (>1 g/L water at 25° C.), which has a hydroxyl group as a hydrophilic structural unit, e.g. a polyvinyl alcohol.

A preferred polymer for the ink acceptance layer is a polyvinylalcohol (PVA), a vinylalcohol copolymer or modified polyvinyl alcohol. The modified polyvinyl alcohol may be a cationic type polyvinyl alcohol, such as the cationic polyvinyl alcohol grades from Kuraray, such as POVAL C506, POVAL C118 from Nippon Goshei.

The pigment in the ink acceptance layer is an inorganic pigment, which can be chosen from neutral, anionic and cationic pigment types. Useful pigments include e.g. silica, talc, clay, hydrotalcite, kaolin, diatomaceous earth, calcium carbonate, magnesium carbonate, basic magnesium carbonate, aluminosilicate, aluminum trihydroxide, aluminum oxide (alumina), titanium oxide, zinc oxide, barium sulfate, calcium sulfate, zinc sulfide, satin white, alumina hydrate such as boehmite, zirconium oxide or mixed oxides.

The inorganic pigment is preferably selected from the group consisting of alumina hydrates, aluminum oxides, aluminum hydroxides, aluminum silicates, and silicas.

Particularly preferred inorganic pigments are silica particles, colloidal silica, alumina particles and pseudo-boehmite, as they form better porous structures. When used herein, the particles may be primary particles directly used as they are, or they may form secondary particles. Preferably, the particles have an average primary particle diameter of 2 µm or less, and more preferably 200 nm or less.

A preferred type of alumina hydrate is crystalline boehmite, or γ-AlO(OH). Useful types of boehmite include DISPERAL HP14, DISPERAL 40, DISPAL 23N4-20, DISPAL 14N-25 and DISPERAL AL25 from Sasol; and MARTOXIN VPP2000-2 and GL-3 from Martinswerk GmbH Useful cationic aluminum oxide (alumina) types include α-$Al_2O_3$ types, such as NORTON E700, available from Saint-Gobain Ceramics & Plastics, Inc, and γ-$Al_2O_3$ types, such as ALUMINUM OXID C from Degussa.

Other useful inorganic pigments include aluminum trihydroxides such as Bayerite, or α-$Al(OH)_3$, such as PLURAL BT, available from Sasol, and Gibbsite, or γ-$Al(OH)_3$, such as MARTINAL grades and MARTIFIN grades from Martinswerk GmbH, MICRAL grades from JM Huber company; HIGILITE grades from Showa Denka K.K.

Another preferred type of inorganic pigment is silica which can be used as such, in its anionic form or after cationic modification. The silica can be chosen from different types, such as crystalline silica, amorphous silica, precipitated silica, fumed silica, silica gel, spherical and non-spherical silica. The silica may contain minor amounts of metal oxides from the group Al, Zr, Ti. Useful types include AEROSIL OX50 (BET surface area 50±15 $m^2$/g, average primary particle size 40 nm, $SiO_2$ content >99.8%, $Al_2O_3$ content <0.08%), AEROSIL MOX170 (BET surface area 170 g/$m^2$, average primary particle size 15 nm, $SiO_2$ content >98.3%, $Al_2O_3$ content 0.3-1.3%), AEROSIL MOX80 (BET surface area 80±20 g/$m^2$, average primary particle size 30 nm, $SiO_2$ content >98.3%, $Al_2O_3$ content 0.3-1.3%), or other hydrophilic AEROSIL grades available from Degussa-Huls AG, which may give aqueous dispersions with a small average particle size (<500 nm).

Generally depending on their production method, silica particles are grouped into two types, wet-process particles and dry-process (vapour phase-process or fumed) particles.

In the wet process, active silica is formed through acidolysis of silicates, and this is polymerized to a suitable degree and flocculated to obtain hydrous silica.

A vapour-phase process includes two types; one includes high-temperature vapour-phase hydrolysis of silicon halide to obtain anhydrous silica (flame hydrolysis), and the other includes thermal reduction vaporization of silica sand and coke in an electric furnace followed by oxidizing it in air to also obtain anhydrous silica (arc process). The "fumed silica" means to indicate anhydrous silica particles obtained in the vapour-phase process.

For the silica particles used in the invention, especially preferred are the fumed silica particles. The fumed silica differs from hydrous silica in point of the density of the surface silanol group and of the presence or absence of pores therein, and the two different types of silica have different properties. The fumed silica is suitable for forming a three-dimensional structure of high porosity. Since the fumed silica has a particularly large specific surface area, its ink absorption and retention are high. Preferably, the vapour-phase silica has an average primary particle diameter of 30 nm or less, more preferably 20 nm or less, even more preferably 10 nm or less, and most preferably from 3 to 10 nm. The fumed silica particles readily aggregate through hydrogen bonding at the silanol groups therein. Therefore, when their mean primary particle size is not larger than 30 nm, the silica particles may form a structure of high porosity.

In a further preferred embodiment, said ink receiving layer can be further crosslinked. Any suitable crosslinker known in the prior art can be used. Boric acid is particularly preferred as crosslinker for the ink receiving layer according to the present invention.

The ink acceptance layer may include other additives, such as colorants, surfactants, biocides, antistatic agents, hard particles for wear resistance, elastomers, UV absorbers, organic solvents, plasticizers, light-stabilizers, pH adjusters, antistatic agents, whitening agents, matting agents and the like.

The ink acceptance layer may consist of a single layer or of two, three or more layers even having a different composition.

The ink acceptance layer(s) can be coated onto the support by any conventional coating technique, such as dip coating, knife coating, extrusion coating, spin coating, slide hopper coating and curtain coating.

Alternatively the ink acceptance layer(s) can also be applied by a printing technique, such as flexographic printing, screen printing and inkjet printing. The inkjet printer preferably employs valve jet printing heads.

Thermosetting Resins

The thermosetting resin is preferably selected from the group consisting of melamine-formaldehyde based resins, ureum-formaldehyde based resins and phenol-formaldehyde based resins.

Other suitable resins for impregnating the paper are listed in [0028] of EP 2274485 A (HUELSTA).

Most preferably the thermosetting resin is a melamine-formaldehyde based resin, often simply referred to in the art as a 'melamine (based) resin'.

The melamine formaldehyde resin preferably has a formaldehyde to melamine ratio of 1.4 to 2. Such melamine based resin is a resin that polycondensates while exposed to heat in a pressing operation. The polycondensation reaction creates water as a by-product. It is particularly with these kinds of thermosetting resins, namely those creating water as a by-product, that the present invention is of interest. The created water, as well as any water residue in the thermosetting resin before the pressing, must leave the hardening resin layer to a large extent before being trapped and leading to a loss of transparency in the hardened layer. The available ink layer can hinder the diffusion of the vapour bubbles to the surface, resulting in adhesion problems.

The paper is preferably provided with an amount of thermosetting resin equalling 40 to 250% dry weight of resin as compared to weight of the paper. Experiments have shown that this range of applied resin provides for a sufficient impregnation of the paper, that avoids splitting to a large extent, and that stabilizes the dimension of the paper to a high degree.

Resin impregnation can cause major paper loss. Financial loss is minimized if the paper is first impregnated and then inkjet printed, because less digital print has to be thrown away. Another advantage of first impregnating and then inkjet printing is dimensional stability, allowing for a wood grain to be embossed in perfect alignment of the inkjet printed wood colour pattern.

The paper is preferably provided with such an amount of thermosetting resin, that at least the paper core is satisfied with the resin. Such satisfaction can be reached when an amount of resin is provided that corresponds to at least 1.5 or at least 2 times the paper weight. Preferably the paper is firstly impregnated through or satisfied, and, afterwards, at least at the side thereof to be printed, resin is partially removed.

Preferably the resin provided on said paper is in a B-stage while printing. Such B-stage exists when the thermosetting resin is not completely cross linked.

Preferably the resin provided on said paper has a relative humidity lower than 15%, and still better of 10% by weight or lower while printing.

Preferably the step of providing said paper with thermosetting resin involves applying a mixture of water and the resin on the paper. The application of the mixture might involve immersion of the paper in a bath of the mixture and/or spraying or jetting the mixture. Preferably the resin is provided in a dosed manner, for example by using one or more squeezing rollers and/or doctor blades to set the amount of resin added to the paper layer.

Methods for impregnating a paper substrate with resin are well-known in the art as exemplified by WO 2012/126816 (VITS) and EP 966641 A (VITS).

The dry resin content of the mixture of water and resin for impregnation depends on the type of resin. An aqueous solution containing a phenol-formaldehyde resin preferably has a dry resin content of about 30% by weight, while an aqueous solution containing a melamine-formaldehyde resin preferably has a dry resin content of about 60% by weight. Methods of impregnation with such solutions are disclosed by e.g. U.S. Pat. No. 6,773,799 (DECORATIVE SURFACES).

The paper is preferably impregnated with the mixtures known from U.S. Pat. No. 4,109,043 (FORMICA CORP) and U.S. Pat. No. 4,112,169 (FORMICA CORP), and hence preferably comprise, next to melamine formaldehyde resin, also polyurethane resin and/or acrylic resin.

The mixture including the thermosetting resin may further include additives, such as colorants, surface active ingredients, biocides, antistatic agents, hard particles for wear resistance, elastomers, UV absorbers, organic solvents, acids, bases, and the like.

The advantage of adding a colorant to the mixture containing the thermosetting resin is that a single type of white paper can be used for manufacturing the decorative layer, thereby reducing the stock of paper for the decorative laminate manufacturer. The use of a colored paper, as already described above, to reduce the amount of ink required for printing a wood motif, is here accomplished by the white paper being colored by impregnation by a brownish thermosetting resin. The latter allows a better control of the amount of brown colour required for certain wood motifs.

Antistatic agents may be used in thermosetting resin. However preferably antistatic agents, like NaCl and KCl, carbon particles and metal particles, are absent in the resin, because often they have undesired side effects such as a lower water resistance or a lower transparency. Other suitable antistatic agents are disclosed by EP 1567334 A (FLOORING IND).

Hard particles for wear resistance are preferably included in a protective layer.

Decorative Layers

The decorative layer includes a thermosetting resin impregnated paper and a colour pattern printed thereon by inkjet. In the assembled decorative panel, the colour pattern is located on the resin impregnated paper on the opposite side than the side facing the core layer.

Before printing a colour pattern, or at least a portion thereof, the paper that has been provided with resin. This measure improves the stability of the paper. In such cases at least a portion of the expansion or shrinkage due to the resin provision takes place before inkjet printing. Preferably the resin provided paper is dried before inkjet printing, for example to a residual humidity of 10% or less. In this case the most important portion of the expansion or shrinkage of the paper layer is neutralized. The advantage of having this dimensional stability is especially observed in the cases where, like in EP 1290290 A (FLOORING IND), a correspondence between the relief and the printed decor is desired.

A decorative panel, like a floor panel, has on one side of the core layer a decorative layer and a balancing layer on the other side of the core layer. However, a decorative layer may be applied on both sides of the core layer. The latter is especially desirable in the case of laminate panels for furniture. In such a case, preferably also a protective layer is applied on both decorative layers present on both sides of the core layer.

Colour Patterns

A colour pattern is obtained by jetting and drying one or more aqueous inkjet inks of an aqueous inkjet ink set upon the substrate.

The colour pattern represents preferably less than 6 g/m$^2$ ink as dry weight.

There is no real restriction on the content of the colour pattern. The colour pattern may also contain information such as text, arrows, logo's and the like. The advantage of inkjet printing is that such information can be printed at low volume without extra cost, contrary to gravure printing.

In a preferred embodiment, the colour pattern is a wood reproduction or a stone reproduction, but it may also be a fantasy or creative pattern, such as an ancient world map or a geometrical pattern, or even a single colour for making, for example, a floor consisting of black and red tiles or a single colour furniture door.

An advantage of printing a wood colour pattern is that a floor can be manufactured imitating besides oak, pine and beech, also very expensive wood like black walnut which would normally not be available for house decoration.

An advantage of printing a stone colour pattern is that a floor can be manufactured which is an exact imitation of a stone floor, but without the cold feeling when walking barefooted on it.

Protective Layers

Preferably a further resin layer, a protective layer, is applied above the printed pattern after printing, e.g. by way of an overlay, i.e. a resin provided carrier, or a liquid coating, preferably while the decor layer is laying on the substrate, either loosely or already connected or adhered thereto.

In a preferred embodiment, the carrier of the overlay is a paper impregnated by a thermosetting resin that becomes transparent or translucent after heat pressing in a DPL process.

A preferred method for manufacturing such an overlay is described in US 2009208646 (DEKOR-KUNSTSTOFFE).

The liquid coating includes preferably a thermosetting resin, but may also be another type of liquid such as a UV- or an EB-curable varnish.

In a particularly preferred embodiment, the liquid coating includes a melamine resin and hard particles, like corundum.

The protective layer is preferably the outermost layer, but in another embodiment a thermoplastic or elastomeric surface layer may be coated on the protective layer, preferably of pure thermoplastic or elastomeric material. In the latter case, preferably a thermoplastic or elastomeric material based layer is also applied on the other side of the core layer.

Liquid melamine coatings are exemplified in DE 19725289 C (ITT MFG ENTERPRISES) and U.S. Pat. No. 3,173,804 (RENKL PAIDIWERK).

The liquid coating may contain hard particles, preferably transparent hard particles. Suitable liquid coatings for wear protection containing hard particles and methods for manufacturing such a protective layer are disclosed by US 2011300372 (CT FOR ABRASIVES AND REFRACTORIES) and U.S. Pat. No. 8,410,209 (CT FOR ABRASIVES AND REFRACTORIES).

The transparency and also the colour of the protective layer can be controlled by the hard particles, when they comprise one or a plurality of oxides, oxide nitrides or mixed oxides from the group of elements Li, Na, K, Ca, Mg, Ba, Sr, Zn, Al, Si, Ti, Nb, La, Y, Ce or B.

The total quantity of hard particles and transparent solid material particles is typically between 5% by volume and 70% by volume, based on the total volume of the liquid coating. The total quantity of hard particles is between 1 $g/m^2$ and 100 $g/m^2$, preferably 2 $g/m^2$ to 50 $g/m^2$.

If the protective layer includes a paper as carrier sheet for the thermosetting resin, then the hard particles, such as aluminium oxide particles, are preferably incorporated in or on the paper. Preferred hard particles are ceramic or mineral particles chosen from the group of aluminium oxide, silicon carbide, silicon oxide, silicon nitride, tungsten carbide, boron carbide, and titanium dioxide, or from any other metal oxide, metal carbide, metal nitride or metal carbonitride. The most preferred hard particles are corundum and so-called Sialon ceramics. In principle, a variety of particles may be used. Of course, also any mixture of the above-mentioned hard particles may be applied.

In an alternative embodiment of a protective layer including a paper as carrier sheet for the thermosetting resin, the inkjet printing is performed on the thermosetting resin impregnated paper of the protective layer. The other paper substrate including a whitening agent, such as titanium dioxide, may then merely be used to mask surface defects of the core layer.

The amount of hard particles in the protective layer may be determined in function of the desired wear resistance, preferably by a so-called Taber test as defined in EN 13329 and also disclosed in WO 2013/050910 A (UNILIN) and U.S. Pat. No. 8,410,209 (CT FOR ABRASIVES AND REFRACTOR).

Hard particles having an average particle size of between 1 and 200 µm are preferred. Preferably an amount of such particles of between 1 and 40 $g/m^2$ is applied above the printed pattern. An amount lower than 20 $g/m^2$ can suffice for the lower qualities.

If the protective layer includes a paper, then it preferably has a paper weight of between 10 and 50 $g/m^2$. Such a paper is often also referred to as a so-called overlay commonly used in laminate panels. Preferred methods for manufacturing such an overlay are disclosed by WO 2007/144718 (FLOORING IND).

Preferably the step of providing the protective layer of thermosetting resin above the printed pattern involves a press treatment. Preferably a temperature above 150° C. is applied in the press treatment, more preferably between 180° and 220° C., and a pressure of more than 20 bar, more preferably between 35 and 40 bar.

In a very preferred embodiment, the decorative panel is manufactured using two press treatments, because this results in an extremely high abrasion resistance. Indeed, during the first press treatment, preferably the layers immediately underlying the wear resistant protective layer are substantially or wholly cured. The hard particles comprised in the wear resistant protective layer are thereby prevented from being pushed down out of the top area of the floor panel into the colour pattern or below the colour pattern and stay in the zone where they are most effective, namely essentially above the colour pattern. This makes it possible to reach an initial wear point according to the Taber test as defined in EN 13329 of over 10000 rounds, where in one press treatment of layers with the same composition only just over 4000 rounds were reached. It is clear that the use of two press treatments as defined above, leads to a more effective use of available hard particles. An alternative advantage of using at least two press treatments lays in the fact that a similar wearing rate, as in the case where a single press treatment is used, can be obtained with less hard particles if the product is pressed twice. Lowering the amount of hard particles is interesting, since hard particles tend to lower the transparency of the wear resistant protective layer, which is undesirable. It becomes also possible to work with hard particles of smaller diameter, e.g. particles having an average particle diameter of 15 µm or less, or even of 5 µm or less.

Balancing Layers

The main purpose of the balancing layer(s) is to compensate tensile forces by layers on the opposite side of the core layer, so that an essentially flat decorative panel is obtained. Such a balancing layer is preferably a thermosetting resin layer, that can comprise one or more carrier layers, such as paper sheets.

As already explained above for a furniture panel, the balancing layer(s) may be a decorative layer, optionally complemented by a protective layer.

Instead of one or more transparent balancing layers, also an opaque balancing layer may be used which gives the decorative panel a more appealing look by masking surface irregularities. Additionally, it may contain text or graphical information such as a company logo or text information.

Methods of Manufacturing Decorative Surfaces

A method of manufacturing a decorative surface includes the method of inkjet printing as described above.

In a preferred embodiment, the method of manufacturing a decorative surface comprises the step of hot pressing at least the core layer and the decorative layer which includes a colour pattern and a thermosetting resin provided paper. Preferably the inkjet printing method of the invention is part of a DPL process, wherein the decorative layer is taken up in a stack to be pressed with the core layer and a protective layer, and preferably also a balancing layer. It is of course not excluded that the method of the invention would form part of a CPL (Compact Laminate) or an HPL (High Pressure Laminate) process in which the decorative layer is hot pressed at least with a plurality of resin impregnated core paper layers, e.g. of so called Kraft paper, forming a substrate underneath the decorative layer, and wherein the obtained pressed and cured laminate layer, or laminate board is, in the case of an HPL, glued to a further substrate, such as to a particle board or an MDF or HDF board.

In a preferred embodiment, a protective layer containing a thermosetting resin is applied onto the inkjet printed colour pattern, wherein the thermosetting resin may be a colored thermosetting resin to reduce the amount of inkjet ink to be printed.

The method of manufacturing a decorative surface preferably includes providing a relief in at least the protective layer, more preferably by means of a short cycle embossing press. The embossing preferably takes place at the same time that the core layer, the decorative layer and the protective layer, and preferably also one or more balancing layers, are pressed together. The relief in the protective layer preferably corresponds to the colour pattern.

Preferably the relief comprises portions that have been embossed over a depth of more than 0.5 mm, or even more than 1 mm, with respect to the global upper surface of the decorative panel. The embossments may extend into the decorative layer.

The balancing layer of a decorative panel is preferably planar. However, a relief might be applied in the balancing layer(s) for improving gluing down of the panels and/or for improved slip resistance and/or for improved, i.e. diminished, sound generation or propagation.

It should be clear that the use of more than one press treatment is also advantageous for the manufacturing of decorative surfaces. Such technique could be used for the manufacturing of any panel that comprises on the one hand a wear resistant protective layer on the basis of a thermosetting synthetic material, possibly a carrier sheet such as paper, and hard particles, and, on the other hand, one or more layers underlying the wear resistant protective layer on the basis of thermosetting synthetic material. The underlying layers may comprise a decorative layer, such as an inkjet printed paper provided with thermosetting resin. As a core layer, such panel might essentially comprise a board material with a density of more than 500 kg/m$^3$, such as an MDF or HDF board material. The manufacturing panels with a plurality of press treatments is preferably put in practice with the so-called DPL panels (Direct Pressure Laminate). In the latter case, during a first press treatment, at least the decorative layer provided with thermosetting resin, is cured and attached to the core material, preferably an MDF or HDF board material, whereby a whole is obtained of at least the decorative layer and the board material, and possibly a balancing layer at the side of the board opposite the decor layer. During a second press treatment, the wear resistant layer is cured and attached to the obtained whole.

In another embodiment, the method for manufacturing a decorative surface uses the inkjet printing method according to the present invention in combination with the methodology disclosed by US 2011008624 (FLOORING IND), wherein the protective layer includes a substance that hardens under the influence of ultraviolet light or electron beams.

In a very preferred embodiment, the method of manufacturing of decorative surface includes the following steps: 1) impregnating a paper with a thermosetting resin; 2) inkjet printing, as described above, a colour pattern on the paper substrate, optionally having an ink acceptance layer, to produce a decorative layer; and 3) applying the decorative layer and a protective layer including a thermosetting resin impregnated paper on a wood-based core layer by means of a short cycle embossing press and optionally at the same time creating relief in at least the protective layer.

The thermosetting resin used in step 1) and/or 3) is preferably a resin or a combination of resins selected from the group consisting of melamine resin, urea resin, acrylate dispersion, acrylate copolymer dispersion and polyester resins, but is preferably a melamine resin. The wood-based core used in step 3) is preferably MDF or HDF.

In an even more preferred embodiment, the decorative layer and the protective layer are applied on a wood-based core layer by means of a short cycle embossing press and at the same time a relief is created in at least the protective layer.

Inkjet Printing Devices

The one or more aqueous inkjet inks may be jetted by one or more print heads ejecting small droplets in a controlled manner through nozzles onto a substrate, which is moving relative to the print head(s).

A preferred print head for the inkjet printing system is a piezoelectric head. Piezoelectric inkjet printing is based on the movement of a piezoelectric ceramic transducer when a voltage is applied thereto. The application of a voltage changes the shape of the piezoelectric ceramic transducer in the print head creating a void, which is then filled with ink. When the voltage is again removed, the ceramic expands to its original shape, ejecting a drop of ink from the print head. However the inkjet printing method according to the present invention is not restricted to piezoelectric inkjet printing. Other inkjet print heads can be used and include various types, such as a continuous type.

The inkjet print head normally scans back and forth in a transversal direction across the moving ink-receiver surface. Often the inkjet print head does not print on the way back. Bi-directional printing is preferred for obtaining a high area throughput. Another preferred printing method is by a "single pass printing process", which can be performed by using page wide inkjet print heads or multiple staggered inkjet print heads which cover the entire width of the ink-receiving surface. In a single pass printing process the inkjet print heads usually remain stationary and the substrate surface is transported under the inkjet print heads.

EXAMPLES

Materials

All materials used in the following examples were readily available from standard sources such as Aldrich Chemical Co. (Belgium) and Acros (Belgium) unless otherwise specified. Where used, water is demineralised water.

PR254 is the abbreviation for C.I. Pigment Red 254 for which Irgazin™ DPP Red BTR from Ciba Specialty Chemicals was used.

Edaplan is an abbreviation used for Edaplan™ 482, a polymeric dispersant from MUNZING.

PEG 200 is a polyethylene glycol having an average molecular weight of 200 from CLARIANT.

PEG 400 is a polyethylene glycol having an average molecular weight of 400 from CLARIANT.

PEG 600 is a polyethylene glycol having an average molecular weight between 570 and 630 g/mol from CALDIC BELGIUM nv.

TEA is triethanol amine.

Syloid™ 72 is a synthetic, amorphous silica appearing as a white free flowing powder available from GRACE.

PVA-sol is a 7.5 wt % solution of a polyvinylalcohol polymer Erkol™ W48/20 available from ERKOL.

Zonyl™ FS-62 is Reaction Product(Gamma-Omega-Perfluoro-C8-10-alkyl Thiocyanate/Peroxyacetic Acid) from Dupont Zonyl™ FSA is a 25% solution of lithium perfluoro alkyl thiopropionate in isopropanol and water with CASRN65530-69-0 from Dupont Zonyl™ FS-610 is a 22% solution of an anionic phosphate fluorosurfactant in water from Dupont Zonyl™ FSN100 is a watersoluble, ethoxylated nonionic fluorosurfactant with 65545-80-4 from Dupont DDS is an alkylarylsoluphonate surfactant with CASRN25155-30-0 obtained from Sigma-Aldrich Tegotwin™ 4000 is a siloxane based gemini surfactant from Evonik TIVIDA™ FL2500 is a solution of 30-35% of an anionic fluorosurfactant in 1-methoxy-2-propanol from Merck MH is a standard décor paper that is impregnated with melamine resin solution and coated with an ink receiving layer of silica in PVA. The silica is Syloid 72 from Grace and is present in an amount of 4 g/m2 and the PVA is CELVOL SP W48 20 from Celanese and present at an amount of 1 g/m2.

Measurement Methods

1. Surface Tension

The static surface tension of the aqueous inkjet inks was measured with a KRÜSS tensiometer K9 from KRÜSS GmbH, Germany at 25° C. after 60 seconds.

2. Viscosity

The viscosity of an inkjet ink was measured, using a Brookfield DV-II+ viscometer at 32° C. at a shear rate of 1,000 $s^{-1}$.

3. Adhesion

Adhesion is evaluated by a cross-cut test according to 1502409:1992(E). Paints. *International standard*. 1992-08-15. using a Braive No. 1536 Cross Cut Tester from BRAIVE INSTRUMENTS with spacing of a 1 mm between cuts and using a weight of 600 g, in combination with a Tesatape™ 4104 PVC tape. The evaluation was made in accordance with a criterion described by Table 2.

TABLE 2

| Criterion | Observation |
| --- | --- |
| 0 | The edges of the cuts are completely smooth: none of the squares of the lattice is detached (=perfect adhesion). |
| 1 | Detachment of small flakes at the intersections of the cuts. A cross-cut area not greater than 5% is affected. |
| 2 | Flaked along the edges and/or at the intersections of the cuts. A cross-cut area greater than 5%, but not significantly greater than 15%, is affected. |

TABLE 2-continued

| Criterion | Observation |
| --- | --- |
| 3 | Flaked along the edges of the cuts partly or wholly in large ribbons, and/or it has flaked partly or wholly on different parts of the squares. A cross-cut area significantly greater than 15%, but not significantly greater than 35%, is affected. |
| 4 | Flaked along the edges of the cuts in large ribbons, and/or some of the squares has detached partly or wholly. A cross-cut area significantly greater than 35%, but not significantly greater than 65%, is affected. |
| 5 | Any degree of flaking that cannot even be classified by classification 4 |

4. Foaming

Foaming was measured by putting the ink formulations in a test tube, followed by vigorous shaking during 20 seconds and allowing it to stand for 10 seconds. The height of the remaining foam column on top of the ink in the test tube was measured in centimeters.

A value of 1.5 cm was considered to be too high to allow safe introduction of such an ink formulation in an inkjet print head and device (ink supply etc.) as gas bubbles would easily occur and hamper the ink jet printing process.

Example 1

This example illustrates the use of aqueous inkjet inks to make decorative flooring laminates.

Preparation of Inkjet Inks

A concentrated aqueous pigment dispersion DIS-1 was made by mixing a composition according to Table 3 for 30 minutes using a Disperlux™ Yellow mixer.

TABLE 3

| Component | Concentration (wt %) |
| --- | --- |
| PR254 | 15.00 |
| Edaplan | 15.00 |
| Water | to complete 100.00 wt % |

The concentrated aqueous pigment dispersion was then milled using a Dynomill™ KDL with 0.04 mm yttrium stabilized zirconium beads YTZ™ Grinding Media (available from TOSOH Corp.). The mill was filled to half its volume with the grinding beads and the dispersion was milled for 3 hours at flow rate of 200 mL/min and a rotation speed of 15 m/s. After milling, the dispersion is separated from the beads. The concentrated aqueous pigment dispersion DIS-1 served as the basis for the preparation of the inkjet inks.

Each of the comparative inkjet inks COMP-1 to COMP-8 and the inventive inkjet inks INV-1 and INV-2 was prepared in the same manner by diluting the concentrated pigment dispersion DIS-1 with the other ink ingredients according to Table 4 and Table 5 expressed in weight % based on the total weight of the ink. The component TEA was used to obtain a pH between 8 and 9. Water was added to complete the ink to the desired pigment concentration

TABLE 4

| | wt % of ink ingredient | | | | |
|---|---|---|---|---|---|
| | COMP-1 | COMP-2 | COMP-3 | COMP-4 | COMP-5 |
| DIS-1 | 18.00 | 18.00 | 18.00 | 18.00 | 18.00 |
| 1,2-hexanediol | 3.00 | 3.00 | 3.00 | 3.00 | 3.00 |
| Glycerine | 20.00 | 20.00 | 20.00 | 20.00 | 20.00 |
| PEG200 | 33.00 | 33.00 | 33.00 | 33.00 | 33.00 |
| Triethanolamine | 0.17 | 0.17 | 0.17 | 0.17 | 0.17 |
| Zonyl™ FS-62 | — | 2.00 | — | — | — |
| Zonyl™ FSA | — | — | 0.50 | — | — |
| Zonyl™ FS-610 | — | — | — | 0.50 | — |
| DDS | — | — | — | — | 0.10 |
| Water | 25.83 | 23.83 | 25.33 | 25.33 | 25.73 |

TABLE 5

| | wt % of ink ingredient | | | | |
|---|---|---|---|---|---|
| | COMP-6 | COMP-7 | COMP-8 | INV-1 | INV-2 |
| DIS-1 | 18.00 | 18.00 | 18.00 | 18.00 | 18.00 |
| 1,2-hexanediol | 3.00 | 3.00 | 3.00 | 3.00 | 3.00 |
| Glycerine | 20.00 | 20.00 | 20.00 | 20.00 | 20.00 |
| PEG200 | 33.00 | — | — | 33.00 | 33.00 |
| PEG400 | — | 33.00 | — | — | — |
| PEG600 | — | — | 33.00 | — | — |
| Triethanolamine | 0.17 | 0.17 | 0.17 | 0.17 | 0.17 |
| Tegotwin™ 4000 | 2.00 | — | — | — | — |
| TIVIDA™ FL2500 | — | 0.38 | 0.38 | 0.38 | — |
| Zonyl™ FSN100 | — | — | — | — | 0.50 |
| Water | 23.83 | 25.45 | 25.45 | 25.45 | 25.33 |

Preparation of Ink Acceptance Layer

A coating solutions AL-1 was prepared using the components according to Table 6. The inorganic pigment Syloid™ 72 was dispersed for 30 minutes using a Disperlux™ mixer in PVA-sol. Ammonia was added to the dispersion to raise the pH above 8.0. The pH was measured at 25° C.

TABLE 6

| g of Component | AL-1 |
|---|---|
| PVA-sol | 26.67 |
| Syloid™ 72 | 8.00 |
| Ammonia | 0.29 |
| Water | 65.04 |
| pH | 8.4 |

An 80 g/m² porous paper used for decor printing was impregnated with an aqueous solution containing 60 wt % of melamine-formaldehyde based resin having a formaldehyde to melamine ratio of 1.7, and dried to a residual humidity of about 8 g/m².

An ink acceptance layer was coated on the impregnated paper by means of a bar coater, providing a wet layer thickness of 40 μm and dried in an oven for 1 minute at 125° C.

Evaluation and Results

Decorative layers were obtained by printing a technical image on the ink acceptance layer using the aqueous inkjet inks of Table 4 and Table 5 and a Ricoh™ Gen 5 print head at a head temperature of 32° C. at 600 dpi. The printed samples were dried for 30 minutes at 50° C.

An assembly was made as shown in FIG. 3, wherein the prepared decorative layer was interposed between a HDF core and a protective layer of unprinted melamine-formaldehyde resin impregnated paper containing aluminium oxide for durability. The assembly was then heat pressed for 20 seconds at 195° C. into a laminate by a DPL process using 138 bar and 50 kg/cm² as settings.

The resulting floor laminates were examined for adhesion. The viscosity, surface tension and foaming of the comparative inkjet inks COMP-1 to COMP-8 and the inventive inkjet inks INV-1 and INV-2 were determined. All results are shown in Table 7.

TABLE 7

| Inkjet Ink | Viscosity (mPa·s) | Surface tension (mN·m) | Adhesion | Foaming (cm) |
|---|---|---|---|---|
| COMP-1 | 10 | 34 | 1 | 0.8 |
| COMP-2 | 10 | 33 | 4 | 1.0 |
| COMP-3 | 10 | 21 | 2 | 1.8 |
| COMP-4 | 10 | 19 | 3 | 0.6 |
| COMP-5 | 10 | 32 | 2 | 0.9 |
| COMP-6 | 10 | 21 | 3 | 0.4 |
| COMP-7 | 14 | 22 | 3 | 0.8 |
| COMP-8 | 17 | 23 | 2 | 0.7 |
| INV-1 | 10 | 21 | 2 | 1.2 |
| INV-2 | 10 | 24 | 1 | 0.6 |

From Table 7, it should be clear that only the inventive inkjet inks INV-1 and INV-2 were capable of simultaneously exhibiting the desired viscosity, surface tension adhesion and foaming.

REFERENCE SIGNS LIST

TABLE 8

| 11 | Paper manufacturer |
|---|---|
| 12 | Paper roll |
| 13 | Decor printer |
| 14 | Gravure printing |
| 15 | Inkjet printing |
| 16 | Decor Paper roll |
| 17 | Warehouse |
| 18 | Impregnation |
| 19 | Cutting to size |
| 20 | Floor laminate manufacturer |
| 21 | Floor laminate |
| 30 | Decorative panel |
| 31 | Core layer |
| 32 | Groove |
| 33 | Tongue |
| 34 | Decorative layer |
| 35 | Protective layer |
| 36 | Balancing layer |

The invention claimed is:

1. An aqueous inkjet ink comprising:
a color pigment;
an alkoxylated fluorosurfactant; and
an ethoxylated oligomer having an average molecular weight smaller than 400; wherein
the aqueous inkjet ink has a static surface tension at 25° C. of no more than 28 mN·m;
the aqueous inkjet ink has a viscosity between 5 and 12 mPa·s at 32° C. at a shear rate of 1,000 s$^{-1}$; and
the alkoxylated fluorosurfactant is selected from the group consisting of:

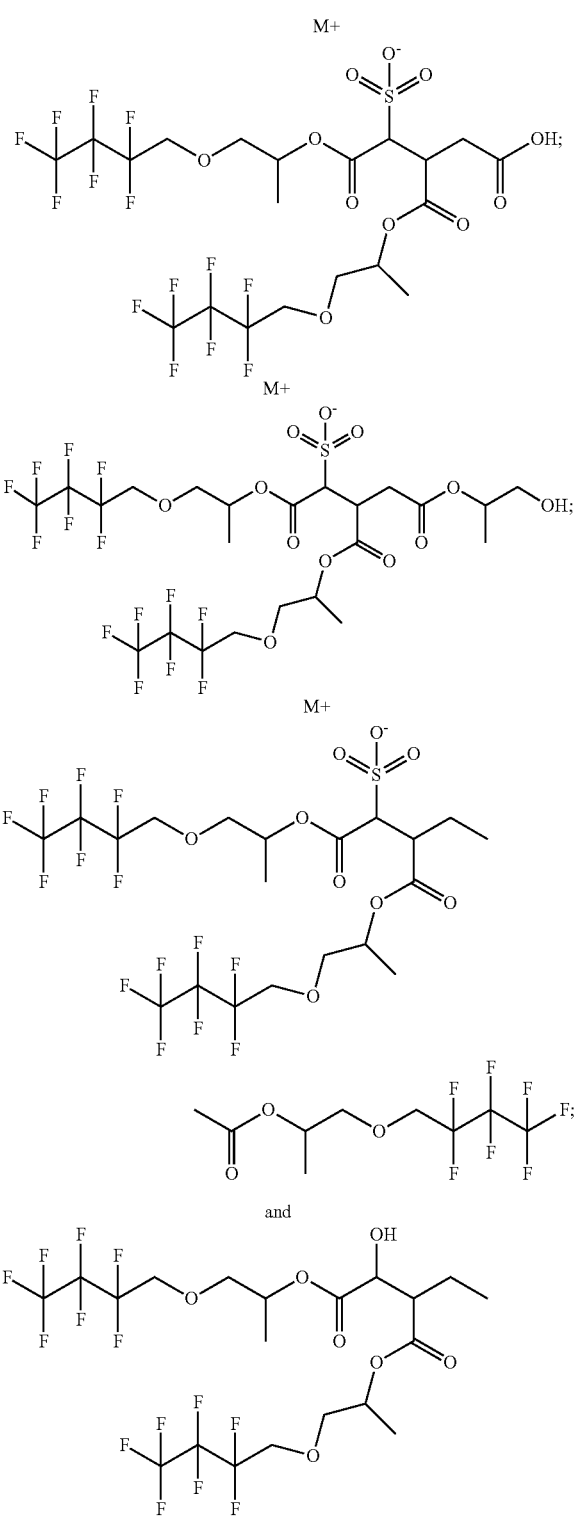

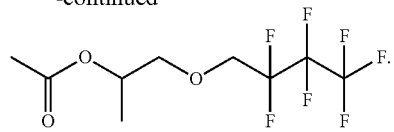

2. The aqueous inkjet ink according to claim 1, wherein the color pigment is a red pigment selected from the group consisting of C.I. Pigment Red 122, C.I. Pigment Red 254, and mixed crystals thereof.

3. The aqueous inkjet ink according to claim 1, further comprising a polymer latex binder.

4. The aqueous inkjet ink according to claim 2, further comprising a polymer latex binder.

5. The aqueous inkjet ink according to claim 3, wherein the polymer latex binder is a polyurethane based latex.

6. The aqueous inkjet ink according to claim 4, wherein the polymer latex binder is a polyurethane based latex.

7. The aqueous inkjet ink according to according to claim 1, further comprising glycerol and/or 1,2-hexanediol.

8. An aqueous inkjet ink set comprising:
two or more aqueous inkjet inks according to claim 1.

9. An inkjet printing method comprising the steps of:
jetting one or more aqueous inkjet inks according to claim 1 onto a substrate; and
drying the one or more aqueous inkjet inks jetted on the substrate.

10. The inkjet printing method according to claim 9, wherein the substrate includes paper.

11. The inkjet printing method according to claim 10, wherein the paper is impregnated with a thermosetting resin.

12. The inkjet printing method according to claim 10, wherein the substrate includes an ink receiver layer including an inorganic pigment and a polymer.

13. The inkjet printing method according to claim 11, wherein the substrate includes an ink receiver layer including an inorganic pigment and a polymer.

14. The inkjet printing method according to claim 9, wherein the substrate is selected from the group consisting of polyvinyl chloride, polyethylene terephthalate, and polyalkylene.

15. A decorative laminate comprising:
a substrate; and
one or more aqueous inkjet inks according to claim 1 on the substrate.

* * * * *